United States Patent [19]
Sly et al.

[11] 4,082,299
[45] Apr. 4, 1978

[54] SEALING MEANS AND ASSEMBLY THEREFORE

[75] Inventors: William Porter Sly; Reginald Karl Ringel, both of Decatur, Ill.

[73] Assignee: Caterpillar Tractor Co., Peoria, Ill.

[21] Appl. No.: 627,981

[22] Filed: Nov. 3, 1975

[51] Int. Cl.$^2$ ............................................. F16J 15/34
[52] U.S. Cl. ..................................................... 277/82
[58] Field of Search ...................... 277/81, 62, 35, 36, 277/61, 82

[56] References Cited
U.S. PATENT DOCUMENTS
2,836,440  5/1958  Brumagim .............................. 277/81

*Primary Examiner*—Robert I. Smith
*Attorney, Agent, or Firm*—Phillips, Moore, Weissenberger, Lempio & Majestic

[57] ABSTRACT

The invention is concerned with novel sealing means for a differential-final drive arrangement and with an assembly method therefore. In a differential-final drive arrangement for a vehicle comprising an axle extending from a differential through a first housing and out a hole therein removed from said differential; a final drive within a second housing having gear means driven by spline means on said axle, said second housing being rotatably supported by said first housing; and a wheel integral with said second housing and rotated by said gear means, the invention provides an improved slidable seal between a first compartment defined by said differential and said first housing and a second compartment defined by said second housing. The improved slidable seal comprises a sleeve thrust bearing about the axle within the second housing having a first end in slidable sealing abutting relation with a respective one of the first housing and the gear means and a second end extending towards a respective other of the first housing and the gear means. The improved slidable seal further includes a sleeve thrust member about the axle within the second housing having a first end abutting a respective other of the first housing and the gear means and a second end fitting within the second end of the bearing. Also a part of the improved slidable seal are compression means biasing the bearing axially away from the member and resilient toroidal sealing means compressed between the axle and the bearing.

9 Claims, 2 Drawing Figures

SEALING MEANS AND ASSEMBLY THEREFORE

BACKGROUND OF THE INVENTION

Field of the Invention

The invention is concerned with differential-final drive arrangements for wheeled vehicles. More particularly the invention is concerned with a particular sealing means between a differential compartment and a final drive and wheel compartment whereby different oil levels can be maintained in each compartment thus significantly cutting down on wear within the differential of the vehicle and further cutting down on the amount of lubricating oil needed in the vehicle.

Prior Art

Generally in the prior art the differential compartment and the final drive and wheel compartment have been directly connected in so far as oil flow is concerned. Thus, the level of lubricating oil in both compartments has been substantially the same. As a result there has been a tendency for oil to transfer from the final drive compartment into the differential. Having a relatively large amount of oil in the differential is undesirable because the oil tends to become overheated by shearing through contact with the moving parts in the differential which has in turn lead to overheating of components within the differential itself. Thus, the problem has arisen of providing a sealing arrangement which must be slidable in order to allow the axle of the differential to pass therethrough and which seal does not allow the flow of lubricating oil from the final drive and wheel compartment into the differential compartment. Also, such a slidable seal desirably provides a good seal even when there is substantial radial misalignment between the axle of a vehicle and the differential compartment. Further, such a slidable seal should still leave the components of the differential readily available for repair and replacement as they become worn out during use. Thus it is highly desirable that any such slidable seal be easily assembleable and disassembleable and when removed allow full access to the axle and differential of the vehicle.

The present invention is concerned with an improved slidable seal between the differential compartment and the final drive and wheel compartment of a wheeled vehicle, which slidable seal substantially prevents the flow of lubricating oil from the final drive and wheel compartment into the differential compartment and which seal is further easily assembleable in a novel manner and by feel alone and which seal is further completely removable from about the axle of the vehicle whereby full access is retained to the differential.

SUMMARY OF THE INVENTION

In one sense the invention comprises an improvement in a differential-final drive arrangement for a vehicle comprising an axle extending from a differential through a first housing and out a hole therein removed from said differential; a final drive within a second housing having gear means driven by spline means on said axle, said second housing being rotatably supported by said first housing; and a wheel integral with said second housing and rotated by said gear means. The improved slidable seal is between a first compartment defined by the differential and the first housing and a second compartment defined by the second housing. The seal comprises a seal thrust bearing about the axle within the second housing having a first end thereof in slidable sealing abutting relation with a respective one of said first housing and said gear means and a second end extending towards a respective other of said first housing and said gear means. Also a part of said improved slidable seal is a sleeve thrust member about said axle within said second housing having a first end abutting said respective other of said first housing and said gear means and a second end sitting within said second end of said bearing. Also a part of the slidable seal of the present invention is compression means biasing the bearing axially away from the member and resilient toroidal sealing means compressed between the axle and the bearing.

In another sense the invention comprises a method for assembling a slidable seal a differential-final drive arrangement comprising an axle extending from a differential through a first compartment in a first housing and out a hole in said first housing into a second compartment in a second housing, said axle including spline means thereon in said second housing driving gear means, said second housing being rotatably supported by said first housing. The method comprises positioning a sleeve thrust bearing about the axle with its first end slidingly sealingly abutting the first housing about said hole; stretching a resilient toroidal sealing means over said spline means about said axle; placing a compression spring about said axle with its first end against said bearing; putting a sleeve thrust member about said axle with its first end adjacent to said spline means and its second end towards said first housing; pushing said member towards said first housing with the second end of said member in propulsive contact with said toroidal sealing means and with said member in contact with a second end of said compression spring; and splining said gear means over said spline means and against said first end of said member.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
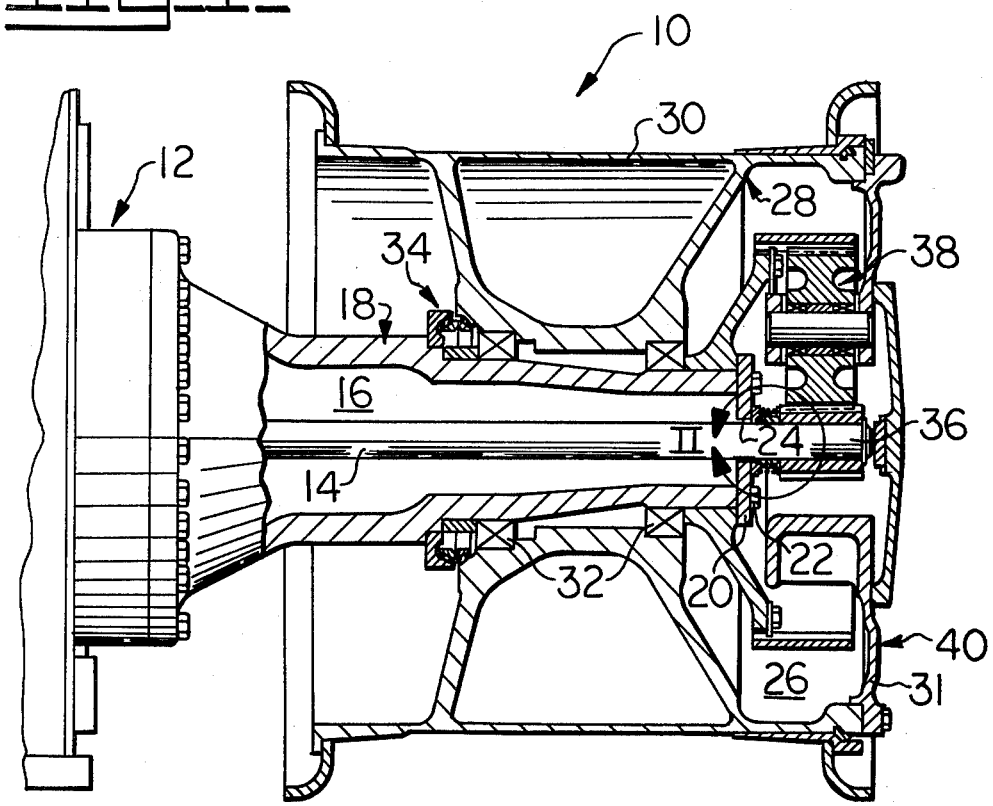
FIG. 1 illustrates a differential-final drive arrangement which includes the improved slidable seal of the present invention.

Referring now first to FIG. 1 there is illustrated an improved differential-final drive arrangement 10 which includes a differential 12 with an axle 14 exiting it, said axle 14 passing within a first compartment 16 which is within a first housing 18. The lubricating oil level within the differential 12 is generally low enough so that it is below the level shown as broken away in FIG. 1. The first housing 18 ends in a plate 20 which is generally held in place by bolts 22 or the like at its other end. The first housing 18 also ends at the differential 12. The plate 20 includes a hole 24 through which the axle 14 passes into a second or final drive compartment 26 within a second housing 28 formed by a wheel 30 and an end cap 31, said second housing 28 being rotatably supported by said first housing 18 via bearings 32. Generally the bearings 32 are sealed as via use of seal means 34.

A splined end 36 of the axle 14 extends from the first compartment 16 into the second compartment 26 wherein it serves to drive gear means, in the embodiment illustrated a gear 38 in a usual manner, said gear 38 then driving the wheel 30 in a usual manner as illustrated. An end 40 of the second housing 28 capped off by the end cap 31 is generally removable so as to provide easy access to the gear 38, the axle 14 and, if necessary the differential 12 as well. Generally, the oil level within the second compartment 26 will be considerably higher than the oil level within the differential 12 to provide adequate lubrication for the gear 38 and bearings 32. Most usually, the oil level within the second compartment will be at about the level of the bottom of the bearings 32.

Figure 2:
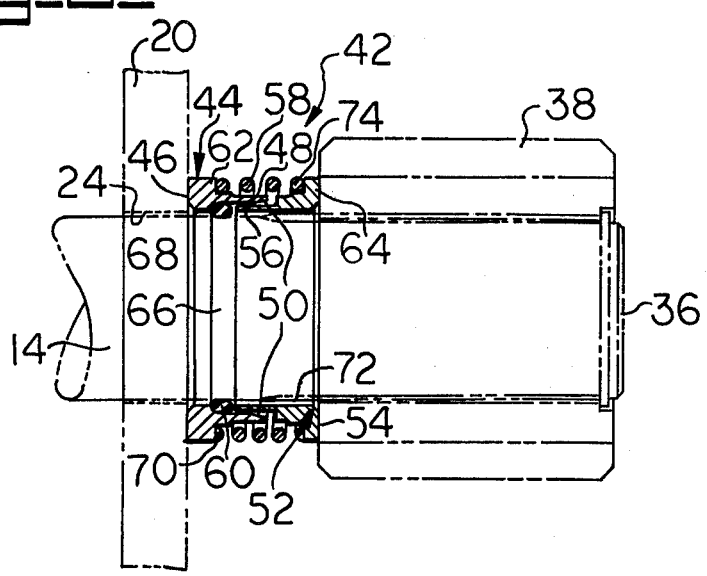
FIG. 2 is an enlarged view of the area II of FIG. 1 and illustrates specifically the improved slidable seal of the present invention.

Referring now most particularly to FIG. 2, there is illustrated the slidable seal 42 of the present invention. Briefly, the slidable seal 42 comprises a sleeve thrust bearing 44 having a first end 46 thereof in slidable sealing abutting relation with said first housing 18 and more particularly with said plate 20 which forms an end of said first housing 18. The sleeve thrust bearing 44 as will be noted is fit about the axle 14 and abuts the end plate 20 about the hole 24 therethrough. The hole 24 is generally made to fit in spaced relation from and hence loosely about the axle 14 so as to allow for substantial radial misalignment without impairment of the seal between the thrust bearing 44 and the end plate 40. The first end 46 of the thrust bearing 44 is generally made of relatively large area to aid in providing a good seal despite radial misalignment. Generally, the bearing 44 will be made of a softer material than will the end plate 20. For example, the bearing 44 will generally be made of bronze or the like while the end plate 20 will generally be made of an iron based alloy such as steel or the like. A second end 48 of the sleeve thrust bearing 44 extends towards the gear 38. The second end 48 of the bearing 44 as will be noted by reference to FIG. 2 generally opens into a mouth 50 of greater internal diameter than the internal diameter of said bearing 44 adjacent its first end 46. This is important in assembly and aligning of the slidable seal 42.

A sleeve thrust member 52 also forms a part of the slidable seal 42. The sleeve thrust member 52 fits about the axle 14 within the second housing 28. The sleeve thrust member 52 has a first end 54 thereof abutting the gear 38 and a second end 56 thereof fitting within the second end 48 of the sleeve thrust bearing 44.

Compression means, in the embodiment illustrated the spring 58, serve to bias the bearing 44 axially away from the member 52. Resilient toroidal sealing means, in the embodiment illustrated the O-ring 60, is compressed between the axle 14 and the bearing 44. The traction between the O-ring 60, the bearing 44 and the axle 14 serves to assure that relative rotation takes place between the bearing 44 and the end plate 20. Generally, the spring 58 is held between a first flange 62 which extends from the bearing 44 outwardly radially and a second flange 64 which extends from the member 52 outwardly radially. Thus, the spring 52 presses outwardly upon the bearing 44 and the member 52. The bearing 44 generally includes groove means, in the embodiment illustrated a shoulder 66 within the bore 68 of the bearing 44. The shoulder 66 serves to hold the O-ring 60 within the bore 68. The first end 46 of the bearing 44 in the preferred embodiment of the invention and as is illustrated in FIG. 2 slidingly sealingly abuts the first housing 18 and the first end 54 of the sleeve thrust member 52 abuts the gear 38. As will be further noted from FIG. 2, the second end 56 of the sleeve thrust member 52 extends within the second end 48 of the sleeve thrust bearing 44 during assembly when the spring 58 is compressed further than in FIG. 2 at least up to the groove 66. This is important in the assembly of the device whereby the O-ring 60 is forced against the shoulder 66 by the second end 56 of the sleeve thrust member 52.

METHOD OF ASSEMBLY

The assembly of the slidable seal 42 into the differential-final drive arrangement 10 can proceed in a "blind" manner. That is, one can operate by feel alone and does not have to carefully observe the placement of each of the individual parts of said slidable seal 42. The sleeve thrust bearing 44 is positioned about the axle 14 with its first end 46 slidingly sealingly abutting the first housing 18 about the hole 24. The O-ring 60 is stretched over the splined end 36 of the axle 14. The compression spring 58 is placed about the axle 14 with its first end 70 against the sleeve thrust bearing 44. The sleeve thrust member 52 is put about the axle 14 with its first end 54 adjacent the splines 72 on the splined end 36 of the axle 14. The second end 56 of the sleeve thrust member 52 is placed towards the first housing 18. The sleeve thrust member 52 is put towards the first housing 18 with the second end 56 of said member 52 in propulsive contact with the O-ring 60 and with the sleeve thrust member 52 in contact with a second end 74 of the spring 58. Finally, the gears 38 are splined over the splines 72 and against the first end 54 of the sleeve thrust member 52. It should be noted that, if desired, the sleeve thrust member 52 can be made unitary with the gear 38 or may be fastened thereto.

Once assembled in the manner described above, it is clear that the sleeve thrust bearing 44, the sleeve thrust member 52, the spring 58 and the O-ring 60 rotate with the axle 14 whereby a sliding sealing contact is attained between the first end 46 of the sleeve thrust bearing 44 and the stationary end plate 20. It is quite clear that lubricating oil and the like cannot pass to any great extent the sleeve thrust bearing 44 and most particularly the first end 46 thereof where it seals against the end plate 20. It is further clear, that the entire assembly can be taken apart and reassembled easily and through feel alone.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A differential-final drive arrangement for a vehicle, said arrangement comprising an axle extending from a differential to a first housing and out a hole therein removed from said differential; first abutment means on said first housing; a final drive within a second housing having gear means driven by spline means on said axle, said second housing being rotatably supported by said first housing; second abutment means on said gear means; and a wheel integral with said second housing and rotated by said gear means, a slidable seal between a first compartment defined by said differential and said first housing and a second compartment defined by said second housing, said slidable seal comprising:
  (1) a sleeve thrust bearing about said axle within said second housing having a first end thereof in slidable sealing abutting relation with a respective one of said first abutment means and said second abutment means and a second end extending towards a respective other of said first abutment means and sand second abutment means;
  (2) a sleeve thrust member about said axle within said second housing having a first end abutting said respective other of said first abutment means and said second abutment means and a second end fitting within said second end of said bearing;
  (3) resilient toroidal sealing means compressed between said axle and said bearing, said second end of said member extending within said second end of said bearing sufficiently to contact said toroidal sealing means on sufficient compression of said spring means; and
  (4) compression means biasing said bearing axially away from said member, said slidable seal maintaining a first oil level in said differential, said first oil level being lower than a second oil level maintained by said slidable seal in said second housing.

2. An improved seal as in claim 1, wherein said second end of said bearing opens into a mouth of greater internal diameter than the internal diameter of said bearing adjacent said first end thereof.

3. An improved seal as in claim 2, including first flange means extending radially outwardly from said bearing and second flange means extending radially outwardly from said member and wherein said compression means comprise spring means bearing against said first and second flange means.

4. An improved seal as in claim 3, wherein said bearing includes shoulder means in the bore thereof against which said toroidal sealing means fit.

5. An improved seal as in claims 4, wherein said first end of said bearing slidingly sealingly abuts said first abutment means and said first end of said member abuts said second abutment means.

6. An improved seal as in claim 5, wherein said first housing includes end plate means adjacent said spline means, said hole passes through said end plate means, and said bearing slidingly sealingly abuts said end plate means, which comprises said first abutment means, about said hole.

7. An improved seal as in claim 6, wherein said hole fits in spaced relation from said axle.

8. An improved seal as in claim 7, wherein said bearing is of a softer material than said end plate means and said member.

9. An improved seal as in claim 8, wherein said bearing is bronze and said end plate means and said member are iron based alloys.

* * * * *